Patented Oct. 28, 1952

2,615,875

UNITED STATES PATENT OFFICE 2,615,875

COPOLYMERS OF VINYLIDENE CYANIDE AND ISOPROPENYL ESTERS

Harry Gilbert, Cuyahoga Falls, and Floyd F. Miller, Akron, Ohio, assignors to The B. F. Goodrich Company, New York, N. Y., a corporation of New York No Drawing. Application August 25, 1950, Serial No. 181,571

10 Claims. (Cl. 260—78.5)

This invention relates to the preparation of novel copolymers of vinylidene cyanide and isopropenyl esters of organic monocarboxylic acids, which copolymers are extremely useful in the preparation of filaments and films.

In U. S. Patents 2,476,270 and 2,502,412 to Alan E. Ardis, and 2,514,387, to Harry Gilbert, novel methods for the preparation of monomeric vinylidene cyanide are disclosed. In a copending application, Serial No. 11,336, filed February 26, 1948, methods for the preparation of useful homopolymers of vinylidene cyanide are disclosed.

Monomeric vinylidene cyanide is a clear liquid at room temperature and a crystalline solid at 0° C. It melts in the range of 6.0° C. to 9.7° C. depending on purity with purest samples melting at 9.0° C. to 9.7° C. and it boils at 40° C. at reduced pressure of 5 millimeters of mercury. It is quite unstable because of its extreme sensitivity to water, undergoing on contact with water at room temperature an instantaneous homopolymerization reaction to give a solid water-insoluble resin. When it is allowed to stand at room temperature in admixture with butadiene-1,3, it reacts therewith to give solid 4,4-dicyanocyclohexene.

It has now been discovered that monomeric vinylidene cyanide of the above physical and chemical characteristics will copolymerize with an isopropenyl ester of certain organic monocarboxylic acids in the presence of a free radical catalyst to give new and useful copolymers.

It has also been discovered that when the polymerization is carried out in such manner that the charge contains from 1 to 90 mole per cent vinylidene cyanide, the copolymers obtained are essentially 1:1 alternating copolymers, that is, copolymers possessing the structure:

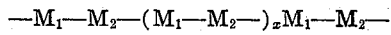

wherein each $M_1$ is a vinylidene cyanide unit, each $M_2$ is a unit of an isopropenyl ester of an organic monocarboxylic acid and $x$ is any number, preferably from 200 to 16,000. The fact that the copolymers thus obtained are 1:1 alternating copolymers is determined by analysis of the copolymer and by the following copolymerization equation of F. M. Lewis, C. Walling, et al., Journal of the American Chemical Society, 70, 1519 (1948):

$$\frac{d(M_1)}{d(M_2)} = \frac{(M_1)}{(M_2)} \cdot \frac{r_1(M_1)+(M_2)}{r_2(M_2)+(M_1)}$$

wherein $(M_1)$ = concentration of unreacted monomer $M_1$
$(M_2)$ = the concentration of unreacted monomer $M_2$ $r_1$ = ratio of the rate constants for the reaction of an $M_1$ type radical with $M_1$ and $M_2$ respectively
$r_2$ = the ratio of the rate constants for the reaction of an $M_2$ type radical with $M_2$ and $M_1$ respectively When the product of $r_1 \cdot r_2$ (the values of $r_1$ and $r_2$ being determined by solving the equation for $r_1$ and $r_2$) is equivalent to zero, a 1:1 alternating copolymer is formed, that is, a copolymer having the

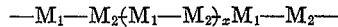

structure shown hereinabove for the copolymers of vinylidene cyanide with isopropenyl esters of organic monocarboxylic acids. It has been found that the product of $r_1$ and $r_2$ as calculated for the vinylidene cyanide isopropenyl ester copolymer system is substantially zero, thus demonstrating that the copolymers possess the essentially 1:1 alternating structure.

Any isopropenyl ester of an organic monocarboxylic acid may be polymerized with vinylidene cyanide to give the alternating copolymers in accordance with this invention. Preferably, however, isopropenyl esters of aliphatic monocarboxylic acids of the formula RCOOH, wherein R is an alkyl radical containing from 1 to 6 carbon atoms, are utilized. Included within this class of esters are isopropenyl acetate, isopropenyl propionate, isopropenyl butyrate, isopropenyl isobutyrate, isopropenyl valerate, isopropenyl caproate, isopropenyl enanthate, and the like. Other isopropenyl esters which may also be polymerized with vinylidene cyanide include isopropenyl benzoate, isopropenyl p-chlorobenzoate, isopropenyl o-bromobenzoate, isopropenyl m-chlorobenzoate, and similar isopropenyl halobenzoates, isopropenyl toluate, isopropenyl alpha-chloroacetate, isopropenyl alpha-bromo propionate, and the like.

The polymerization itself may be carried out in several different ways. One preferred method consists in first dissolving the vinylidene cyanide and the isopropenyl ester in benzene or other aromatic solvent such as toluene, methyl toluene, trichlorobenzene, or the like, preferably free from impurities which initiate the ionic polymerization of the monomer, and in an amount such that the solvent comprises approximately 30 to 80% by weight of the total solution. A polymerization catalyst is included in this solution and the resulting mixture is heated to a temperature of about 20° C. to 100° C. whereupon polymerization occurs to form the desired copolymer as a white powder of small particle size. The copolymer thus formed may be separated from the polymerization medium simply by filtering, or if desired the solvent may be removed by evaporation.

A second method of polymerization consists in agitating the monomers in a liquid aliphatic hydrocarbon (which are non-solvents for vinylidene cyanide), for example, hexane or heptane, in the presence of a polymerization catalyst whereupon the copolymer forms and may be separated from the polymerization medium by filtering or by evaporating the medium. It is important when using this method of polymerization that the liquid aliphatic hydrocarbon be free from impurities which initiate the ionic polymerization of vinylidene cyanide.

Alternatively, the polymerization may be carried out without the use of a solvent or other liquid medium for the monomers, that is, simply by heating and agitating a mixture of the monomers and polymerization catalyst. Also, the polymerization may be effected at temperatures as low as 0° C. or lower or as high as 100° C. or even higher provided a catalyst is utilized which will dissociate into free radicals at the polymerization temperature.

It is to be understood, of course, that regardless of the polymerization method utilized, the polymerization should be stopped before either of the monomers is entirely consumed, in order that an essentially 1:1 alternating copolymer will be obtained. Otherwise, when either of the monomers is completely used up, the product will contain straight polymer obtained by polymerization of the remaining monomer. Accordingly it is often desirable to add, continuously or intermittently, fresh quantities of one or both of the monomers, and also of catalyst and solvent if desired, to the polymerization mixture in the course of the polymerization, thus taking fullest advantage of the capacity of the equipment and in effect operating a continuous or semi-continuous process.

The catalyst which is used in the polymerization is preferably a peroxygen compound such as silver peroxide, the perborates, the percarbonates, benzoyl peroxide, caproyl peroxide, lauroyl peroxide, acetone peroxide, acetyl benzoyl peroxide, cumene hydroperoxide, o,o'-dichlorobenzoyl peroxide, o,o'-dibromobenzoyl peroxide, caprylyl peroxide, pelargonyl peroxide, tertiary butyl hydroperoxide, and the like. In general from .01 to 2% by weight of the catalyst based on the monomer charge is utilized, although smaller or larger amounts may be utilized if desired.

The following examples illustrate the preparation of copolymers of vinylidene cyanide and isopropenyl esters of organic monocarboxylic acids in accordance with this invention, but are not to be construed as a limitation upon the scope thereof for there are, of course, numerous possible variations and modifications. In the examples all parts are by weight.

Example I 2.4 parts (25 mole per cent) of vinylidene cyanide, and 9.6 parts (75 mole per cent) of isopropenyl acetate are placed in 12 parts of benzene. 0.13 parts of o,o'-dichlorobenzoyl peroxide are then added to the benzene solution and the entire mixture heated for a period of 22 hours at a temperature of 40° C., during which time particles of white, resinous copolymer precipitate from the benezene. This copolymer is then filtered off and analyzed to determine its composition. The copolymer is found to contain 52 mole per cent of vinylidene cyanide. It is soluble in acetone, isopropenyl acetate and dimethyl formamide, but is insoluble in benzene and acetic acid.

Examples II to V

Example I is repeated except that the mole per cent of vinylidene cyanide in the polymerization charge is varied, 1 mole per cent being utilized in Example II, 50 mole per cent in Example III, 75 mole per cent in Example IV and 90 mole per cent in Example V. In each instance the copolymer obtained contains from 48 to 52 mole per cent of vinylidene cyanide, thus demonstrating that the copolymers obtained when the charge contains from 1 to 90 per cent of vinylidene cyanide are all essentially 1:1 alternating copolymers.

When other isopropenyl esters of organic monocarboxylic acids are substituted for isopropenyl acetate in the above examples, the copolymers obtained are also essentially 1:1 alternating copolymers having properties generally equivalent to the vinylidene cyanide-isopropenyl acetate copolymers. Likewise, when the polymerization is carried out according to the other methods described hereinabove, or using other of the peroxygen cataylsts disclosed, excellent results are achieved. In each instance the copolymers are found to be resinous materials which are soluble in acetone, isopropenyl acetate and dimethyl formamide and are insoluble in benzene.

As disclosed hereinabove, the copolymers of this invention are valuable in the preparation of solutions from which can be spun filaments of any desired size and which exhibit a crystalline pattern when examined by X-rays and which possess high tensile strength, excellent resistance to the action of alkalis and acids, as well as many other advantageous properties. Also, since the copolymers of this invention are characterized by having a definite softening point, ordinarily in the range of 150 to 160° C. they may be melt spun, cast into excellent films or molded into various shaped objects.

Although specific examples of the invention have been herein described, it is not intended to limit the invention solely thereto, but to include all of the variations and modifications falling within the spirit and scope of the appended claims.

We claim:

1. A copolymer of monomeric vinylidene cyanide and an isopropenyl ester of an organic monocarboxylic acid selected from the class consisting of saturated aliphatic monocarboxylic acids and aromatic monocarboxylic acids in which any carbon to carbon unsaturation is present in a benzene ring, said copolymer possessing essentially the structure

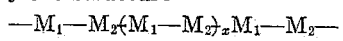

wherein each $M_1$ represents the vinylidene cyanide unit of the structure

and each $M_2$ represents a unit of said isopropenyl ester of the structure

wherein $R_1$ is the acyl radical of said organic monocarboxylic acid and $x$ represents a number, said copolymer being a resinous, heat-softenable solid which is soluble at room temperature in dimethyl formamide, but which is insoluble at room temperature in benzene and in acetic acid, and the monomeric vinylidene cyanide entering into said copolymer to produce the vinylidene cyanide units being a liquid at room temperature and a crystalline solid at 0° C. having a melting point when in purest form of substantially 9.0° C. to 9.7° C. and being characterizable chemically by the ability to undergo on contact with water at room temperature an instantaneous homopolymerization reaction to give a solid water-insoluble resin and by the ability to react at room temperature with butadiene-1,3 to give solid 4,4-dicyanocyclohexene.

2. The copolymer of claim 1 wherein the isopropenyl ester is an isopropenyl ester of an organic monocarboxylic acid which possesses the structure RCOOH, wherein R is an alkyl radical.

3. The copolymer of claim 1 wherein the isopropenyl ester is an isopropenyl ester of an organic monocarboxylic acid which possesses the structure RCOOH, wherein R is an alkyl radical containing from 1 to 6 carbon atoms.

4. The copolymer of claim 1 wherein the isopropenyl ester of an organic monocarboxylic acid is isopropenyl acetate.

5. The method which comprises preparing a liquid medium containing liquid monomeric vinylidene cyanide, said monomeric vinylidene cyanide being characterizable chemically by the ability to undergo on contact with water at room temperature an instantaneous homopolymerization reaction to give a solid water-insoluble resin, admixing said liquid medium with an isopropenyl ester of an organic monocarboxylic acid selected from the class consisting of saturated aliphatic monocarboxylic acids and aromatic monocarboxylic acids in which any carbon to carbon unsaturation is present in a benzene ring, in an amount such that the mixture contains from 1 to 90 mole per cent monomeric vinylidene cyanide and with a peroxygen catalyst in an amount from 0.01 to 1% by weight based on the monomeric vinylidene cyanide, and maintaining the resulting mixture at a temperature of 20° C. to 100° C., thereby to form a solid, resinous copolymer of said isopropenyl ester and vinylidene cyanide possessing essentially the structure $$-M_1-M_2(M_1-M_2)_xM_1-M_2-$$

wherein each $M_1$ represents the vinylidene cyanide unit of the structure

and each $M_2$ represents a unit of said isopropenyl ester of the structure

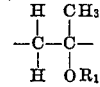

wherein $R_1$ is the acyl radical of said organic monocarboxylic acid and $x$ represents a number.

6. The method of claim 5 wherein the isopropenyl ester is an isopropenyl ester of an organic monocarboxylic acid which possesses the structure RCOOH, wherein R is an alkyl radical.

7. The method of claim 5 wherein the isopropenyl ester is an isopropenyl ester of an organic monocarboxylic acid which possesses the structure RCOOH, wherein R is an alkyl radical containing from 1 to 6 carbon atoms.

8. The method of claim 5 wherein the liquid medium containing monomeric vinylidene cyanide consists of monomeric vinylidene cyanide dissolved in an organic solvent which is inert thereto.

9. The method of claim 5 wherein the liquid medium containing monomeric vinylidene cyanide consists of monomeric vinylidene cyanide dissolved in a liquid hydrocarbon.

10. The method of claim 5 wherein the isopropenyl ester of an organic monocarboxylic acid is isopropenyl acetate, the liquid medium containing monomeric vinylidene cyanide consists of monomeric vinylidene cyanide dissolved in benzene and the peroxygen catalyst is o,o'-dichlorobenzoyl peroxide.

HARRY GILBERT.
FLOYD F. MILLER.

REFERENCES CITED

The following references are of record in the file of this patent:

UNITED STATES PATENTS

| Number | Name | Date |
| --- | --- | --- |
| 2,466,395 | Dickey | Apr. 5, 1949 |